G. J. BRYANT.
FERTILIZER DISTRIBUTER.
APPLICATION FILED JULY 20, 1910.
1,050,076.
Patented Jan. 7, 1913.
2 SHEETS—SHEET 2.
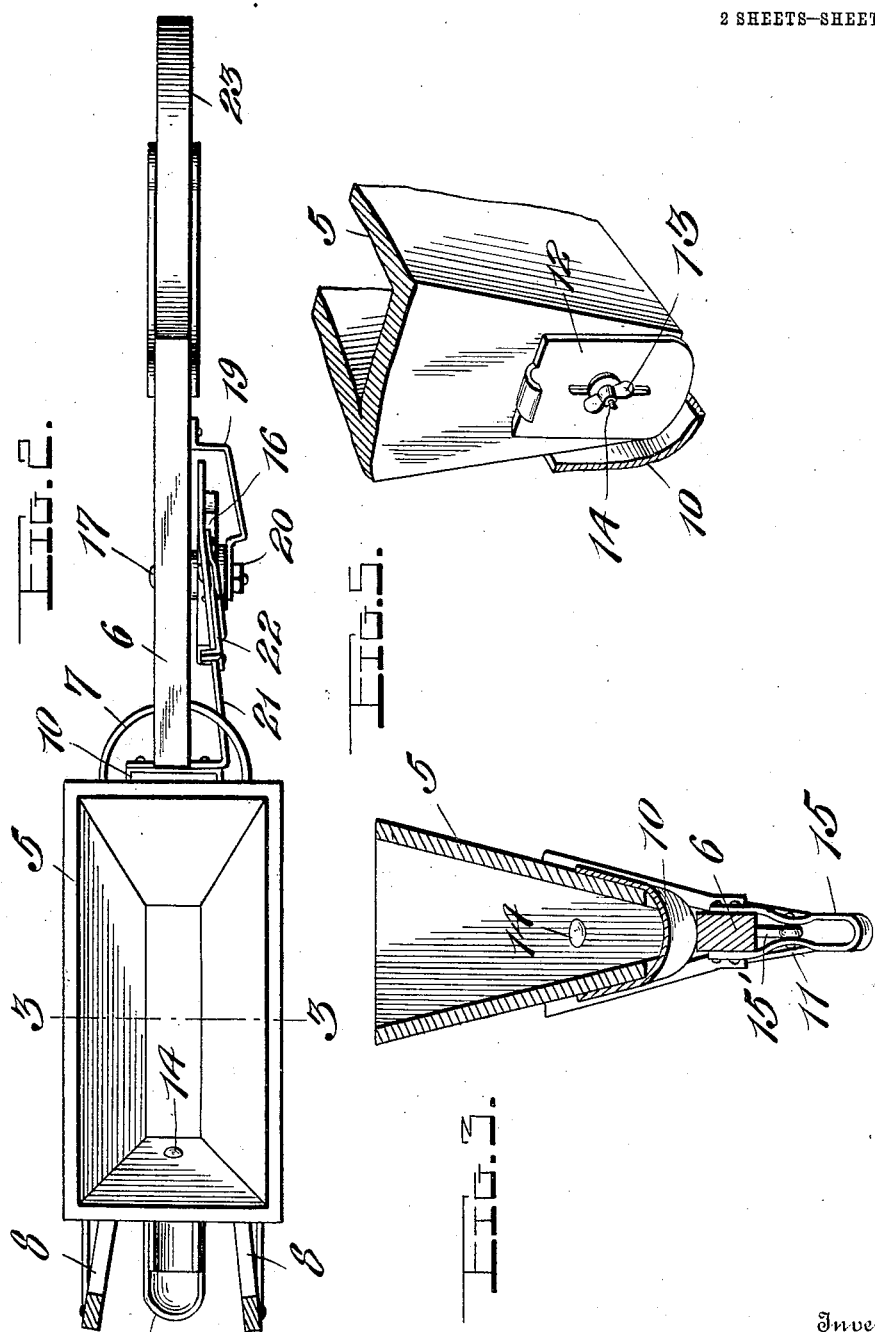

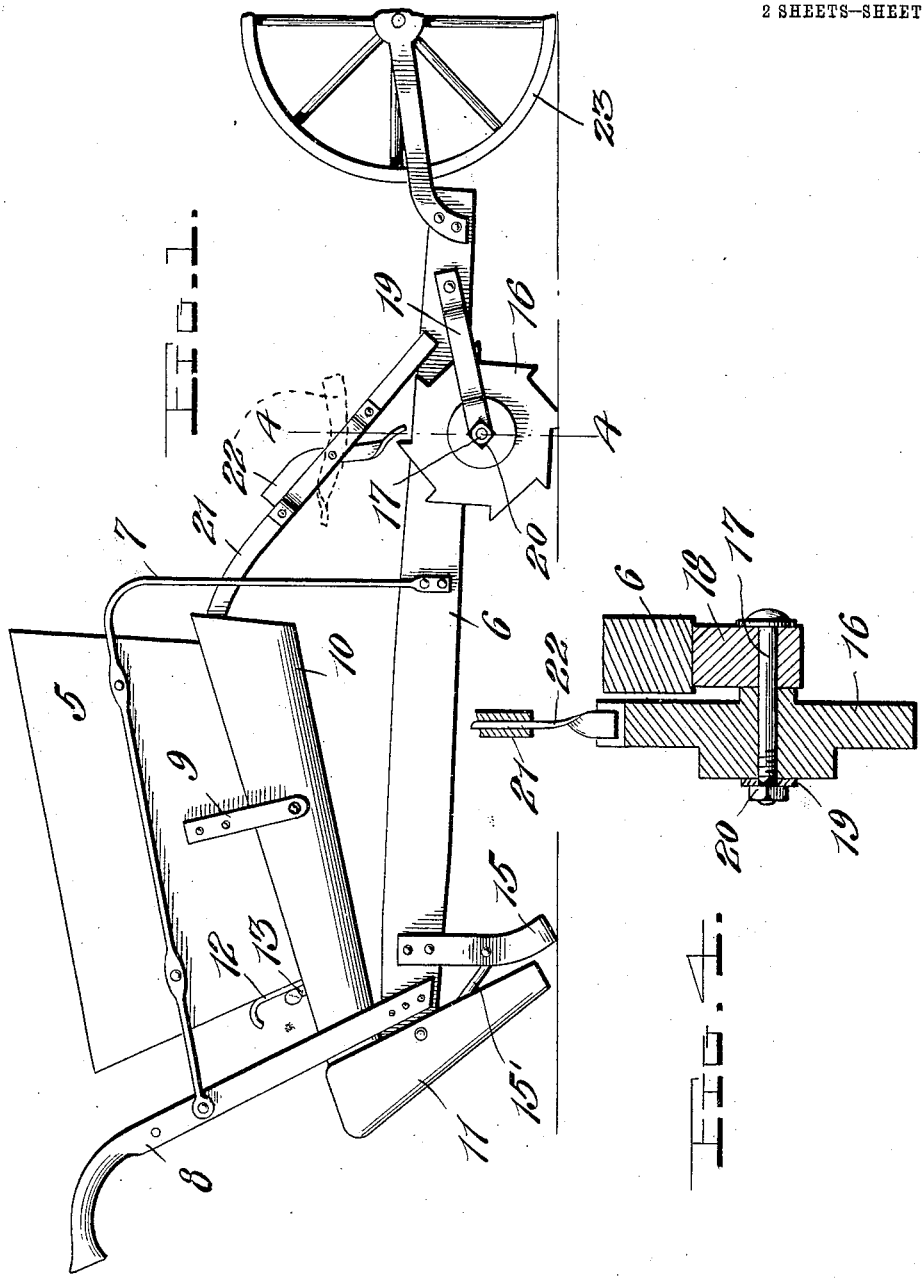

UNITED STATES PATENT OFFICE.

GEORGE J. BRYANT, OF ALEXANDRIA, ALABAMA.

FERTILIZER-DISTRIBUTER.

1,050,076.

Specification of Letters Patent.

Patented Jan. 7, 1913.

Application filed July 20, 1910. Serial No. 572,844.

*To all whom it may concern:*

Be it known that I, GEORGE J. BRYANT, a citizen of the United States, residing at Alexandria, in the county of Calhoun and State of Alabama, have invented certain new and useful Improvements in Fertilizer-Distributers, of which the following is a specification, reference being had to the accompanying drawings.

This invention relates to an improved fertilizer distributer and more particularly to a machine of this character which is adapted to be moved over the ground surface to distribute the fertilizing material.

The primary object of my invention is to provide means for agitating the fertilizing material in the hopper to insure a constant feed of the same when it has become wet or damp.

Another object is to provide means for agitating the inclined trough from which the fertilizer gravitates into the depositing shoe and to simultaneously disturb or loosen the soil.

With these and other objects in view, the invention consists of the novel features of construction, combination and arrangement of parts hereinafter fully described and claimed, and illustrated in the accompanying drawings, in which—

Figure 1 is a side elevation of a machine constructed in accordance with my invention; Fig. 2 is a top plan view thereof; Fig. 3 is a section taken on the line 3—3 of Fig. 2; Fig. 4 is a section taken on the line 4—4 of Fig. 1, and Fig. 5 is a detail fragmentary perspective view of the rear end of the hopper.

Referring more particularly to the drawings, 5 indicates the hopper which is mounted upon the beam 6. This hopper may be arranged and supported in any desired manner but I preferably provide the rods 7 which are secured to the beam and extend above the same and are then longitudinally disposed and have their ends secured to the handles 8 which are secured to the rear end of the beam 6. The longitudinally extending portions of these rods are disposed upon opposite sides of the hopper 5 and are secured thereto. Bars 9 are secured to the opposite sides of the hopper 5 and extend below the same. Between these bars the rearwardly inclined trough 10 is pivotally arranged. This trough is preferably formed from sheet metal and at its forward end extends upwardly in front of the hopper. The rear end of the trough is open and is disposed above the shoe 11 which is mounted upon the rear end of the beam 6. This shoe is loosely arranged on the beam and is adapted to be moved to discharge the material therefrom in case the same becomes clogged in the lower end of the shoe. The amount of material fed from the hopper into the shoe is regulated by means of the adjustable plate 12 which is arranged on the rear end of the hopper and is adapted to be secured in its adjusted position by means of the wing nut 13 threaded upon the end of the bolt 14 extending through the hopper and a longitudinal slot in said plate. It will be obvious that as the lower end of the plate is moved with relation to the lower open end of the hopper, the amount of material which escapes under the plate will be regulated in accordance with this adjustment. A depending foot member or furrow opener 15 is secured to the beam 6 in advance of and adjacent to the lower end of the shoe 11 and is adapted to engage in the ground and remove stones and other material from the path of movement of the machine so that the fertilizer is deposited in the furrow formed by the foot member 15.

In order to prevent clogging of the material in the trough when the same has become wet or damp, I provide the ratchet wheel 16 which is mounted upon a shaft 17 arranged in a bearing 18 secured to the under side of the beam 6. The outer end of the shaft is disposed through the end of the arm 19 secured at its other end to the beam. A nut 20 is threaded on this end of the shaft and secures the same in the arm. A bar 21 is secured to the forward end of the trough 10 and extends forwardly and downwardly therefrom above the ratchet wheel 16. On this bar a pivoted arm 22 is arranged and has its upper end disposed at an angle for engagement with the bar to limit its pivotal movement. The lower end of said arm is extended in parallel relation to the bar and engages with the teeth of the ratchet. The beam 6 is mounted at its forward end upon the ground wheel 23 which supports the same as it is moved over the ground.

In the operation of the machine, the hopper 5 is filled with the fertilizing material and the machine pushed or wheeled over the ground by the operator who grasps the handles 8. As the machine progresses, the teeth of the ratchet wheel 16 engage in the soil and loosen the same. At the same time the lower end of the arm 22 is engaged by these teeth and the rearwardly extending trough 10 agitated. The weight of the outer end of the trough and the bar 21 secured thereto normally retains the forward end of the trough spaced from the hopper and as the arm is successively engaged by the teeth of the ratchet the forward end is lifted and dropped thus agitating the fertilizing material and causing the same to gravitate rearwardly in the trough and into the depending depositing shoe 11. When the fertilizer material flows freely and it is unnecessary to agitate the trough, the arm 22 may be swung around so as to dispose its lower end rearwardly in engagement with the bar 21 out of the path of movement of the ratchet teeth. In the event that the material should clog in the lower end of the shoe 11 the operator has only to grasp the upper end of the shoe and move the same on the end of the beam to dislodge the material. The depending foot member 15 is supported and braced from the beam by means of a rod 15' which is secured to said foot member and to the rear end of the beam.

It will be observed upon reference to Figs. 1 and 2 of the drawings that the upper portion of the arm 22 is longer and heavier than the lower portion thereof and that the upper portion of the arm terminates in a transverse extension which bears on the bar 21. Hence when the arm is turned to engage with the ratchet wheel 16 it stays in such position as shown in Figs. 1 and 2 and when its upper portion is turned forwardly so as to disengage it from the ratchet wheel 16, owing to the weight of the upper portion of the arm it will remain, by its own gravity, in such disengaged position. Hence the said arm, by gravity, will retain itself either in engaging position or in disengaging position with respect to the ratchet wheel accordingly, as it may be placed.

From the foregoing it will be seen that I have devised a very simple and efficient machine for the purposes in view and that a constant feed of the material is maintained and the ground prepared to receive the same as the machine is moved. The machine is, moreover, very durable in construction and may be manufactured at a comparatively low cost.

While I have shown and described the preferred embodiment of the invention, it will be understood that the same may be variously modified without departing from the essential feature or sacrificing any of the advantages thereof.

Having thus described the invention what is claimed is:—

1. The herein described fertilizer distributer comprising in combination a beam having a supporting wheel at its front end and a hopper supported above its rear end, a longitudinally inclined oscillatory trough pivotally connected to and arranged below the hopper, a peripheral ratcheted ground engaging wheel mounted near the forward end of the beam, a downwardly and forwardly inclined bar secured to the forward end of the trough, the free end of said bar being disposed above the ratchet wheel, and an arm pivoted intermediate of its ends upon said inclined bar, one end of the said arm forming a pawl for engagement with the upper side of the ratchet wheel, the other end of said arm being heavier than the pawl end, and extending above and resting upon the bar above the pivotal point of the arm, the position of said arm adapted to be reversed so that the heavier portion thereof may be disposed on the bar below the pivotal point of the arm whereby the pawl end is maintained out of engagement with the ratchet wheel.

2. A fertilizer distributer including a beam, a wheel connected to the beam at the front end of the latter and supporting the front end of the beam, a hopper supported by the beam above the rear end of the latter, an oscillatory trough connected to and arranged below the hopper, a peripherally toothed ground engaging wheel supported by the beam at the rear of the ground wheel, the toothed ground engaging wheel being separate and distinct from the first named wheel, a downwardly and forwardly inclined bar secured to the trough, the front ends of said bar being disposed above the toothed ground engaging wheel, and an arm pivoted intermediate of its ends upon said bar, one end of said arm forming a pawl engaging with the ground engaging teeth of the second named wheel and the other end of said arm resting upon the bar for the purpose specified.

In testimony whereof I hereunto affix my signature in the presence of two witnesses.

GEORGE J. BRYANT.

Witnesses:
R. S. THORNBERRY,
JOHN NUNNENNLEY.

Copies of this patent may be obtained for five cents each, by addressing the "Commissioner of Patents, Washington, D. C."